Figure 3:
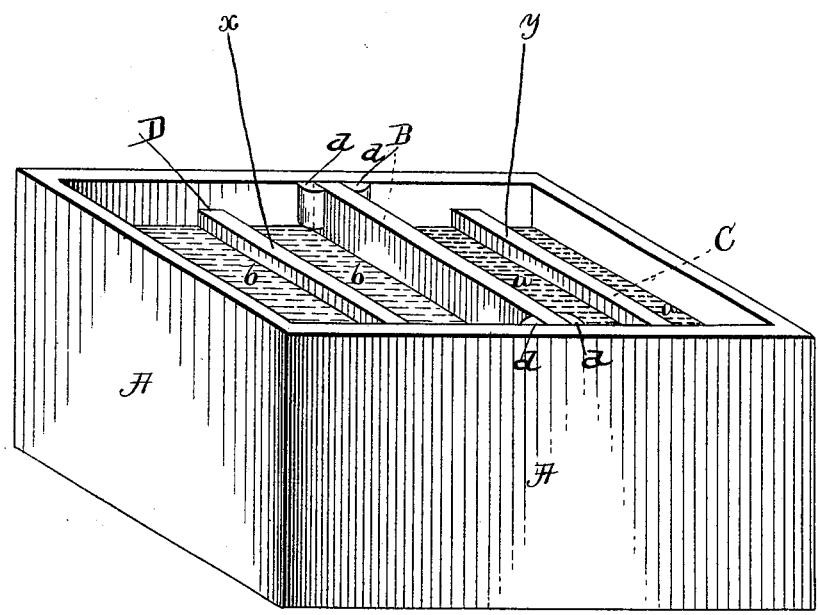

(No Model.) 2 Sheets—Sheet 1.
I. L. ROBERTS & H. L. BREVOORT.
SEPARATING DIAPHRAGM FOR GALVANIC BATTERIES.
No. 394,614. Patented Dec. 18, 1888.
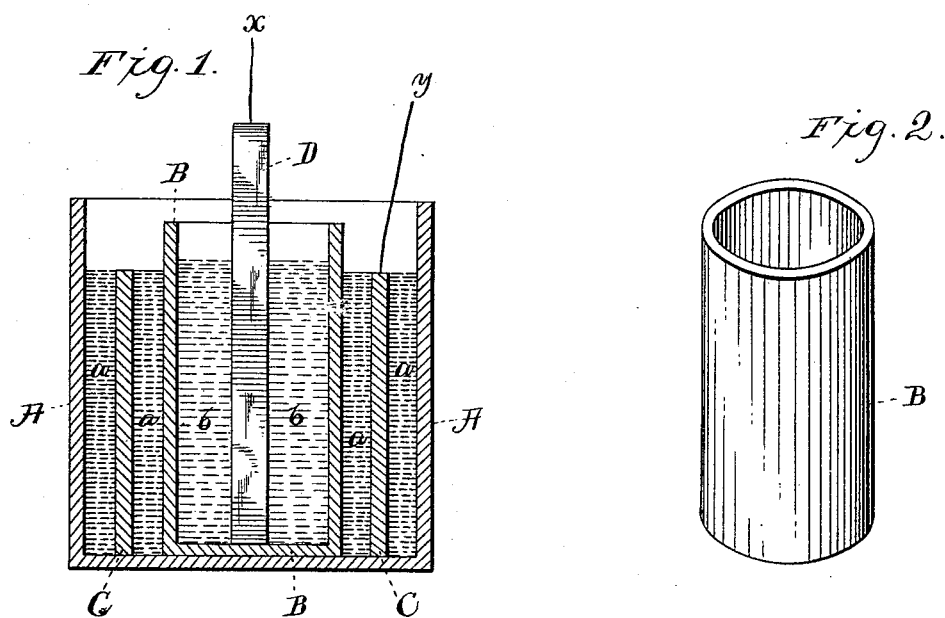
Witnesses:
W. E. Bowen
Joseph L. Levy
Inventors:
Isaiah L. Roberts
and Henry L. Brevoort
by Marcus S. Hopkins.

(No Model.) 2 Sheets—Sheet 2.

I. L. ROBERTS & H. L. BREVOORT.
SEPARATING DIAPHRAGM FOR GALVANIC BATTERIES.

No. 394,614. Patented Dec. 18, 1888.

Witnesses:—
W. E. Bowen
Joseph L. Levy

Inventors,
Isaiah L. Roberts
and Henry L. Brevoort
by Marcus S Hopkins.

N. PETERS, Photo-Lithographer, Washington, D. C.

UNITED STATES PATENT OFFICE.

ISAIAH L. ROBERTS AND HENRY L. BREVOORT, OF NEW YORK, N. Y., ASSIGNORS TO THE ROBERTS-BREVOORT ELECTRIC COMPANY, (LIMITED,) OF SAME PLACE.

SEPARATING-DIAPHRAGM FOR GALVANIC BATTERIES.

SPECIFICATION forming part of Letters Patent No. 394,614, dated December 18, 1888.

Application filed August 7, 1888. Serial No. 282,174. (No specimens.)

*To all whom it may concern:*

Be it known that we, ISAIAH L. ROBERTS and HENRY L. BREVOORT, both residents of the city of New York, county of New York, in the State of New York, and citizens of the United States, have made a new and useful Improvement in means for separating two fluids physically from one another without preventing chemical action between the fluids, and offer the following as such a full, clear, and exact description as will enable others skilled in the art to make our new and improved article.

Fluids have frequently been separated by porous partitions, either made in the form of diaphragms across the vessel or made in the form of a cup or jar and placed within the vessel; but such separating means have either been porous, so that they would allow or even promote transfusion of the liquids, or else they have entirely prevented the transfusion of the liquids, and in so doing have cut off any chance of setting up chemical action between the two liquids—that is to say, a separating wall or partition that will separate two fluids effectively has not before the date of our invention possessed electrolytic properties.

Our invention, therefore, resides in a new article of manufacture, to wit, a diaphragm partition or cup adapted to separate two liquids, which diaphragm is practically non-porous, but possesses electrolytic properties, so that the liquid on one side of the partition or cup will not intermix or intermingle with the liquid on the other side of the partition or cup or only to a very limited extent, but through which partition chemical action can and may take place.

In carrying out our invention we may construct the partition, diaphragm, or cup either partially or wholly of a gelatinous or jelly-like material, which is non-porous and which contains moisture as one of its characteristic elements. This partition may be made of starch, preferably boiled in a strong brine of some salt or chloride, such as chloride of sodium or salt of zinc and the gelatinous or jelly-like mass so produced may be confined between walls of cloth or other suitable material to form the diaphragm or partition. Instead of the starch we may use boiled flour, say, rice-flour, wheat-flour, or any gelatinous substance obtained from grain or plants. The materials which are the least soluble are to be preferred. The partition may also be made of dough of flour and water, which may be left unboiled, and may be confined between the containing-walls. The thickness of the gelatinous or jelly-like mass forming the partition should be anywhere from a quarter of an inch upward, varying in thickness, though we do not limit ourselves to any special thickness. The gelatinous material may be introduced into a thickness of cloth and felt by being caused to enter and close the pores thereof. In this case the two retaining-walls of cloth will not be necessary. In all cases we prefer to use a salt in the gelatinous material, as it increases the electrolytic properties of the partition. One pound of starch, six pounds of water, two pounds of chloride of sodium, and two ounces of cotton fiber may be boiled and stirred together till cooked with satisfactory results. Cooking is accomplished when the starch-granules are broken. The cloth separating-walls or the fibrous material having its pores filled with the gelatinous material are to be supported either on a frame having a cup shape or upon a square frame which can be cemented at its edges to the walls of the vessel which is to be divided by the partition or diaphragm. We may also use albuminous materials, which may be obtained from either animal or vegetable sources—such as the white of egg, for instance—which should be boiled or otherwise treated to make the albumen of the necessary gelatinous or a jelly-like material, for the purpose intended. Such albuminous materials we combine, preferably, with the salt of a chloride or an alkaline earth, in order to increase the electrolytic properties of the partition, diaphragm, or cup. Such material may be supported between walls of cloth or between separating starch-walls of any fabric; or albuminous materials may be combined with porous substances of felt, into the pores of which albuminous materials are to permeate, and are to thus form within the pores of the felt an albuminous mass possessing the electrolytic properties and forming a separating partition, diaphragm, or cup, which will permit chemical action to be had through it, but will practically prevent all physical transfusion of the fluids on either side of the partition.

Another method of forming the partition, cup, or diaphragm is to saturate a porous substance—such as felt, porous clay, or the like—with an aqueous solution of the silicate of soda or potash, say, from 25° to 40° Baumé. The solution should be just thin enough to enable it to penetrate the pores of the support or holder and thick enough to make a good jelly-like filling in the pores of the holder, and heat may be used to hasten the saturation, which operation generally takes from two to ten hours—the longer the better. When the holder is thoroughly saturated, we dip it—say for an hour—in muriatic acid, which we prefer, or the salts of a metal—such as chloride of lime. These substances cause the silicate to deposit silica, in the shape of a gelatinous mass, in the pores of the holder. After the holder is thus saturated with the silicate of soda we treat it with any mineral acid or any salt for the purpose of gelatinizing the same, or potash. If a clay cup is used as a support for the material, a strong acid may be used; but if felt or the like is used the acid must be weak enough, so as not to affect the felt. With a weak acid or salt the treatment must be longer than with a strong acid or a concentrated solution of a metallic salt.

The period during which the partition, cup, or diaphragm must be left in the acid or salt will vary with the thickness of the partition or the strength of the acid or salt; but from an hour to ten hours will in ordinary cases be sufficient, bearing in mind the directions before given, and using as strong materials as can be used, which at the same time are not strong enough to injure the supporting medium. The gelatinous material may be formed and held between supporting-sheets, of cloth or other materials.

It is evident that the above article can be made with various substances which form what we call "mineral gelatinous masses." Now, our invention includes all such substances, though it is preferred to use the silicates of soda or potash and preferably a porous baked-clay holder.

We do not limit ourselves to forming the gelatinous mass in the pores of these particular holders or supports, for it may be introduced into or between such substances in various ways; neither do we wish to limit ourselves to any particular form of construction of holder or support, or to any particular mineral substance which can be gelatinized; neither to any particular gelatinizing agent, though we prefer an acid, such as sulphuric or muriatic. Besides silicate of soda or potash we may use the salts of tin—such as stannates and chlorides—which can be gelatinized—the stannates by treatment with an acid, the chloride by treatment with an alkali. Thus in both cases preceding we gelatinize the stannates or silicates. The salts of aluminum may also be gelatinized by treatment with an alkali. The various mineral substances which can be gelatinized are numerous, and works on chemistry will give an account of them. So, also, we may make our separating diaphragm, cup, or partition by saturating a porous baked-clay holder, which we prefer, or a piece of felt goods, by the following method:

We take, say, six pounds of water, preferably hot, and dissolve, say, four pounds of bar-soap in it. While the water is still hot we plunge into it an ordinary clay porous cup preferably. The cup or other holder or material is to be held in the solution till no air comes out of it, which will indicate that it is thoroughly saturated. This will require from two to ten hours, according to the fineness of the holder and the thickness thereof, and in exceptional cases more time will be required than here stated. The holder and the contained material are taken from the solution and are plunged into a bath of sulphuric or muriatic acid or other acid or salts, such as bichromate of soda or potash, or a solution of sal-ammoniac may be used. If the solution is strong, the treatment will be correspondingly short; if weak, the treatment will be longer. We prefer to treat it in this way for a number of hours, or until all the material held in the pores of the holder has been gelatinized. It is advantageous to mix with the solution of soap silicate of soda in quantities of about one-third or one-quarter by weight of the soap used; also, paraffine, rosin, and gums generally can be added in small proportions, and are advantageous.

Thus it will be seen that there are various methods in which the article may be produced; but our invention resides in forming a separating partition, cup, or diaphragm adapted to separate two fluids, and which diaphragm, cup, or partition opposes practically an absolute barrier against physical transfusion, though permitting chemical action to take place through it; and such a partition, cup, or diaphragm may be produced in any of the ways above described or in other ways; but the methods herein set forth will produce satisfactory results, as our new article of manufacture consists of a diaphragm, cup, or separating-partition having the qualities above enumerated. Such separating partitions, diaphragms, or cups may be used in electric batteries, or they may be used in chemical operations where currents of electricity are employed for the purpose of electrolysis, and by which methods various chemical products can be cheaply and easily produced, the chemical action taking place through the cup while the liquids on either side as such are kept separate and distinct from each other; also, in this way pottery vessels can be treated to make them waterproof.

We believe that we are the inventors, broadly, of the article herein described, consisting of a porous holder or support saturated or combined with a gelatinized substance, as above described, which will make the diaphragm, cup, or separating-partition impervious, practically, to the physical transfusion of the fluids placed on either side of it.

Although we have described our invention carried out with a porous support or holder, some of the materials can, in some instances, be used without a holder or support, thus forming a diaphragm, cup, or separating-partition, which will separate and keep apart one or more fluids, but will allow of chemical action passing through such separating diaphragm or cup; and although this is not the best form in which to practice the invention nevertheless it may be, under certain conditions, so practiced, and a porous support or holder may be dispensed with. We also deem it best in all cases to use a porous support; and for this purpose we prefer, as we have before said, baked earthenware made very porous and in cup form, as this latter avoids the necessity of cementing the edges of the partition or diaphragm to the walls of the vessel to be separated.

In the accompanying drawings are shown two examples of our invention.

Figure 1 is a vertical section of a battery containing our invention. Fig. 2 is a perspective view of a cup, which is our invention detached. Fig. 3 is a perspective view of a battery in which our cup is used.

In Fig. 1 the cell, which may be square or round, is shown at A, and the cup is shown at B, made in any of the ways described in the specification, but preferably of baked earthenware and very porous, and having the pores preferably filled with silicate of soda properly gelatinized, so as to give to the cup the physical characteristics herein described. The elements are shown at C and D, with their conducting-wires $x$ and $y$ leading from them. The two fluids $a$ and $b$ are shown as separated by the cup B.

In Fig. 3 a cell, A, is shown, having in it the elements C and D, each surrounded by its appropriate solution $a$ and $b$. The solution or liquids are separated by the partition, diaphragm, or separating-wall B, which is cemented at all points to the wall of the cell A, as shown at $d$. The separating-partition, like the cup in Figs. 1 and 2, must have the physical structure or density to be capable of separating two fluids, as described, yet possessing the electrolytic quality essential to the chemical or electrolytic action of the fluids through it without physical transfusion in the ordinary sense.

Any mere change of form may be made in the cup or partition or in the arrangement of the cell and elements, as desired, without departing from the essence of our invention.

What we claim is—

1. As a new article of manufacture, a cup, partition, or diaphragm for use in an electric battery or electrolytic bath, composed of a porous substance having its pores closed with gelatinous material.

2. As a new article of manufacture, a cup, partition, or diaphragm for use in an electric battery or electrolytic bath, composed of gelatinous material combined with a supporting sheet or sheets of textile material.

3. As a new article of manufacture, a cup, partition, or diaphragm for use in an electric battery or electrolytic bath, composed of textile or fibrous materials impregnated with a gelatinous material.

In testimony of all which we have hereunto subscribed our names.

ISAIAH L. ROBERTS.
HENRY L. BREVOORT.

Witnesses:
JOSEPH L. LEVY,
B. T. VETTERLEIN.